United States Patent [19]

Patton

[11] 3,977,424
[45] Aug. 31, 1976

[54] DIFFERENTIAL PRESSURE REGULATOR VALVE FOR A HYDROSTATIC TRANSMISSION CONTROL SYSTEM

[75] Inventor: Jon R. Patton, Jackson, Mich.
[73] Assignee: Clark Equipment Company, Buchanan, Mich.
[22] Filed: Apr. 14, 1975
[21] Appl. No.: 567,680

[52] U.S. Cl. .............................. 137/106; 60/445; 91/446; 91/464; 137/116.3; 137/495
[51] Int. Cl.² ......................................... F15B 13/04
[58] Field of Search ............... 60/445, 484, 487; 91/421, 446, 464; 137/106, 116.3, 495

[56] References Cited
UNITED STATES PATENTS

| 3,143,127 | 8/1964 | Frost | 137/116.3 |
| 3,339,672 | 9/1967 | Crandall | 137/495 X |
| R28,113 | 8/1974 | Howard et al. | 60/445 X |

FOREIGN PATENTS OR APPLICATIONS

| 974,907 | 11/1964 | United Kingdom | 137/116.3 |

Primary Examiner—Alan Cohan
Assistant Examiner—Gerald A. Michalsky
Attorney, Agent, or Firm—Ernst H. Ruf

[57] ABSTRACT

An improved differential pressure regulator valve for a hydrostatic transmission control system wherein the valve regulates high fluid pressure versus low fluid pressure and produces a pressure differential that in turn controls the transmission. The regulator valve includes a valve body whose bore is in communication with both first and second sets of fluid inlet and outlet ports, with the valve bore containing a spool assembly that includes first and second cooperating spool members, with the second spool member being operable to control the fluid flow between the first inlet and outlet ports or the second inlet port and the first outlet port. Means, including a passage connecting the first outlet port with a spool port, fluidly unbalances the second spool member by applying the pressure of fluid in the first outlet port to one end of the second spool member in opposition to the biasing action of a regulating spring. Further means, including a passageway in the valve body that connects the second outlet port with the other end of the second spool member, fluidly unbalances the second spool member by applying the pressure of fluid in the second outlet port to the other end of the second spool member in addition to the biasing force of the regulating spring. Additional means are utilized for biasing the first spool member toward one of two extreme positions.

14 Claims, 6 Drawing Figures

DIFFERENTIAL PRESSURE REGULATOR VALVE FOR A HYDROSTATIC TRANSMISSION CONTROL SYSTEM

BACKGROUND OF THE INVENTION

1. Field of the Invention

The field of art to which this improvement pertains includes differential pressure regulator valve means for use in fluid operated control systems. More particularly, the valve means of this invention is constructed to control and regulate differential fluid pressures and it may be disposed, for example, in a control system for a hydrostatic transmission.

2. Description of the Prior Art

Briefly, this invention constitutes an improvement in pressure regulating control valve mechanisms. Such control valve mechanisms are often used in the prior art for regulating pressure to a fluid operated clutch of the type often found in the constant-mesh power-shift transmissions of industrial lift trucks and other machines. Specifically, such prior art control valve means are frequently constructed to permit an immediate relief of a portion of the clutch application pressure followed by a regulated decrease or increase in the fluid pressure supplied to the fluid clutch whereby the latter may be gradually disengaged or engaged by the operator. One particular use of this type of regulating valve, contemplates the control of a fluid-pressure actuated clutch for the transmission of an industrial lift truck where it is often necessary to hold the truck stationary while the lift fork is operated at a speed corresponding to full engine speed without shifting the transmission to the neutral position. It is desirable, in such circumstances, to be able to precisely move or "inch" the vehicle in either the forward or reverse direction in order to achieve accurate positioning and handling of materials.

Various controls and regulating valves for performing the above-stated function in conjunction with power-shift transmission employing fluid pressure actuated transmission clutches have been disclosed previously as exemplified by U.S. Pat. No. 3,143,127, to Frost, issued Aug. 4, 1964.

In order to carry out its regulating valve function, the valve means, such as described in the previously-identified patent, have been provided to effect improved gradual engagement and disengagement of the vehicle clutch after relief of excess pressures in the system by operating such valve means in conjunction with the application and release of the vehicle brakes. In such structures, wherein the operation of the valve means may be either hydraulic or mechanical, when the brakes are actuated, the valve means shifts to a position partially interrupting fluid flow from a clutch control valve and effects controlled partial deactuation of a clutch means by maintaining a relatively low fluid pressure, thus providing control of the torque to the wheels of the vehicle. In this prior art type of regulating valve control system, only one pressure, namely, the clutch pressure, has to be regulated. However, in hydrostatic transmissions, which have no clutches, control of the torque to the wheels of the vehicle must be controlled in a different manner.

SUMMARY OF THE INVENTION

One way of controlling the torque to the wheels in a vehicle equipped with a hydrostatic transmission is to control the movement of the swash plate of the vehicle main propulsion pump.

In a known hydrostatic transmission control system, a main propulsion system, driven by a prime mover, is connected to one or more fluid traction motors which in turn drive the vehicle wheels. A fixed displacement charge pump, driven at prime mover speed, is used as a source of both fluid under a high pressure and fluid under a lower pressure, with these fluid pressures in turn being utilized for the actuation of a spring-centered double-acting hydraulic motor or cylinder whose piston rod is connected to one end of the main propulsion pump swash plate. The movement of the piston rod, in one direction or the other, causes a corresponding movement of the swash plate to thereby change the displacement of the main propulsion pump. Thus, at any given time, a differential pressure is produced by the engine driven charge pump, with the magnitude of this differential pressure varying directly with the magnitude of the engine speed. The resulting pressure produces a reaction in the hydraulic cylinder that controls the swash plate which, in turn, causes a propulsion action on the vehicle drive wheels. The total affect is that the propulsion of the vehicle varies with engine speed and the action produced by this system is swash plate motion in proportion to engine rpm. This known prior art control system also includes a directional control valve and a differential pressure regulator valve which can influence the displacement of the propulsion pump swash plate. The high and low fluid pressures that indirectly act on the swash plate can be overridden by the differential pressure regulator valve via a control input which originates in a brake master cylinder upon the depressing of the brake pedal by the vehicle operator.

The valve means of the present invention constitutes an improvement upon the structure of the previously-identified patent by providing, among other things, a differential pressure regulator valve that regulates the difference between high pressure and low pressure independent of atmospheric pressure and low pressure so as to regulate a pressure differential in a balanced double-acting cylinder which in turn controls the swash plate displacement.

In summary, the differential pressure regulator valve of this invention includes a valve body whose bore is in communication with both a first and second set of pressure inlet and outlet ports respectively. An annular groove in a valve body permits continuous communication between the second inlet and outlet ports. Disposed within the valve bore is a spool assembly that includes a first spool member that is actuatable between two extreme positions and a second spool member which is operable to control fluid flow between the first inlet and outlet ports or the second inlet and the first outlet port, with the second spool member having a bore therein through which a rod of the first spool member freely extends. A regulating spring tends to bias the second spool member to a position that establishes unrestricted flow between the first inlet and outlet ports. Means, including a passage for connecting the first outlet port with the spool member bore, fluidly unbalances the second spool member by applying the pressure of fluid in the first outlet port to one end of the second spool member in opposition to the biasing action of the regulating spring. Further means, including a passageway in the body that connects the second outlet port with the other end of the second spool member, fluidly unbalances the second spool member by applying the pressure of fluid in the second outlet port to the other end of the second spool member in addition to the biasing action of the regulating spring. One or more return springs are also disposed in the main bore for biasing the first spool member toward one of the two extreme positions.

In one of the extreme positions of the first spool member there is at least restricted flow between the first inlet and outlet ports whereas at the other of the extreme positions of the first spool member there is at least restricted flow between the second inlet and the first outlet ports. However, in a position intermediate the two extreme positions of the spool, there is no flow between either of the first inlet and outlet ports or the second inlet and first outlet ports, with the pressure that acts on the one end of the second spool member being balanced by the combination of the force of the regulating spring and the pressure acting on the other end of the second spool member.

Full application of the vehicle brakes by the operator permits communication between the second inlet and the first outlet port so that the second inlet port is now connected to both outlet ports thereby conducting equal pressure fluid to both sides of the swash plate control cylinder thus causing the piston therein to become centered and moving the swash plate back to its zero position which in turn stops the vehicle.

Thus, while the prior art regulating valves only function to control clutch pressure and therefore need and utilize only high pressure and atmospheric pressure, the regulating valve of this invention regulates the difference between high pressure and low pressure independent of atmospheric pressure and low pressure so as to produce a pressure differential for controlling swash plate displacement and vehicle movement.

Other features and advantages of this improved differential pressure regulator valve will be more readily understood by persons skilled in the art when following the detailed description in conjunction with the drawings.

DESCRIPTION OF THE PREFERRED EMBODIMENT

Figure 1:
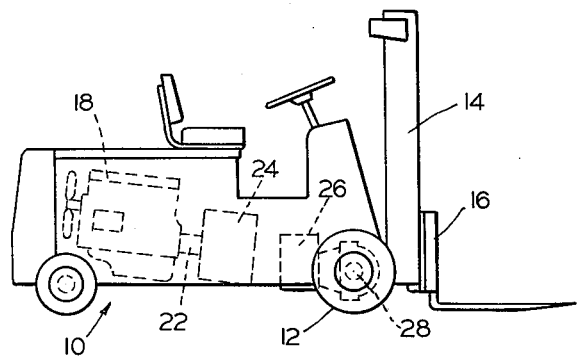
FIG. 1 is a simplified elevational view of a lift truck having a hydrostatic transmission that incorporates the present invention.

Referring now to the drawings in detail, the transmission control system of the present invention is shown in FIG. 1 as being mounted in a lift truck 10 having drive wheels 12, the conventional upright 14 and a load mechanism 16. The lift truck or traction vehicle 10 includes an internal combustion engine 18 which drives, through a drive shaft 20 (FIG. 2), a conventional fixed displacement charge pump 22 and a conventional variable displacement axial piston propulsion pump 24. Engine 10 may also drive one or more auxiliary fixed or variable displacement pumps (not shown) for supplying fluid under pressure to hydraulic accessories (not shown). Pump 24 is connected via fluid lines (not shown in FIG. 1) to one or more conventional fixed displacement fluid traction motors 26. If but one fluid motor is utilized, drive wheels 12 are driven through an axle assembly 28 as shown in FIG. 1. In the alternative, each wheel 12 can be driven separately by a fluid motor 26 as shown in FIG. 2.

Figure 2:
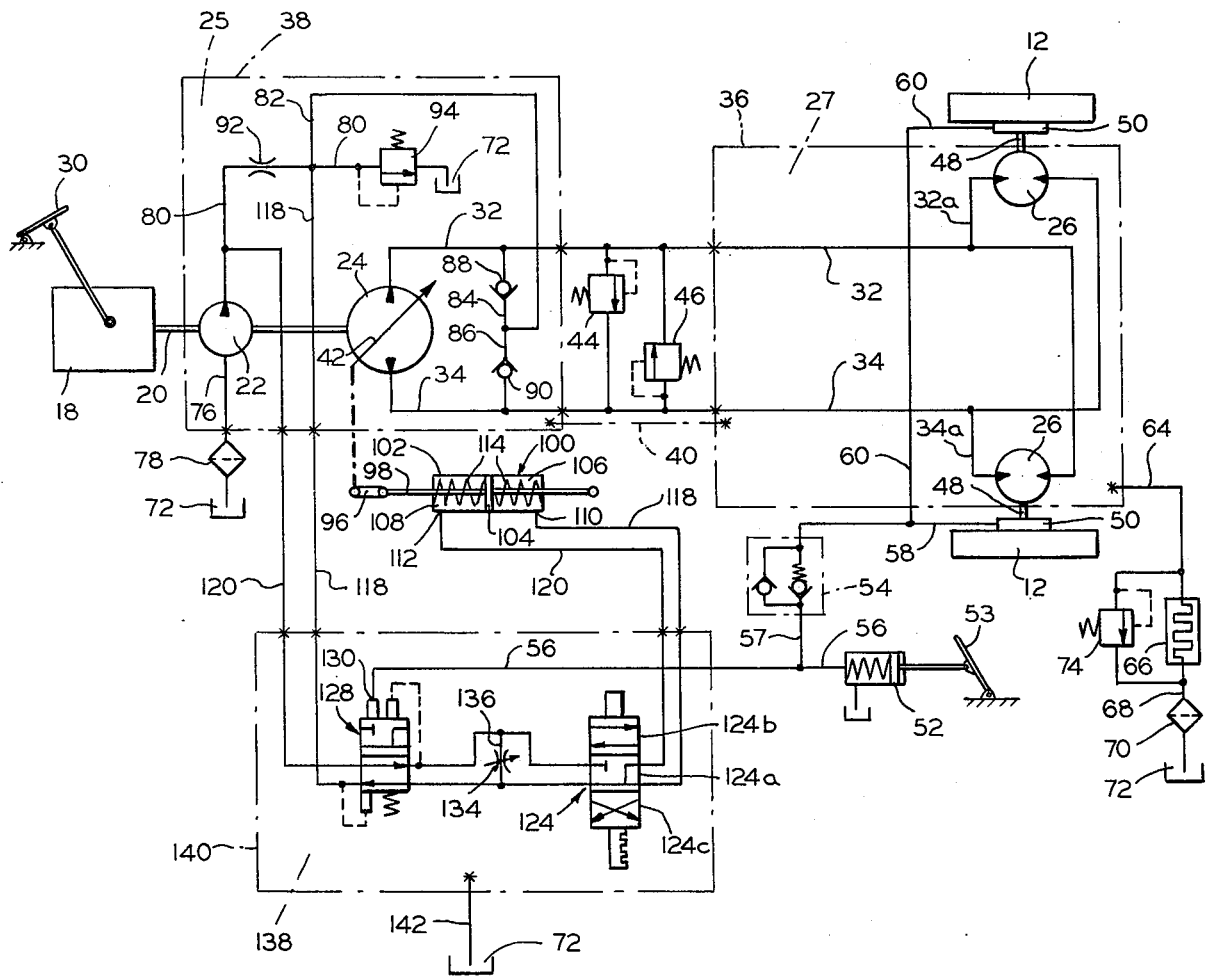
FIG. 2 is a diagrammatic view of a hydrostatic transmission system for a traction vehicle of the type shown in FIG. 1, including the hydraulic circuitry and components embodied in the present invention.

As best seen in FIG. 2, engine 18 is controlled by an operator via accelerator pedal 30 and propulsion pump 24 is connected to fluid motors 26 by means of conduits 32, 32a and 34, 34a which serve to supply the pressurized fluid, generated by pump 24, to motors 26, with motors 26 having a casing 27 that is diagrammatically bounded by phantom line 36.

Pumps 22 and 24 are also located within one or more pump casings 25 which are diagrammatically bounded by phantom line 38, with the connection between casings 36 and 38 being indicated by line 40.

Propulsion or main power pump 24 is of the variable displacement type and preferably of the well-known piston type wherein multiple pumping pistons are engaged by a common thrust plate that gives the pistons their reciprocative pumping action. The thrust or swash plate 42 of such a pump has a variable angle which affects simultaneous variation of the strokes of all of the pump pistons from minimum to maximum within a predetermined displacement range. Swash plate 42, when actuated, serves to vary the displacement of pump 24 and is designed to inherently return to its zero displacement position with a force which increases as swash plate 42 is actuated away from its zero displacement position. A further inherent characteristic of pump 24 is that as the load imposed on pump 24 by motors 26 increases, the force which tends to return swash plate 42 to its zero displacement position also increases.

As previously noted, propulsion pump 24 is in an enclosed hydraulic circuit with motors 26 via conducts 32, 32a and 34, 34a, with conduits 32 and 34 being cross connected via external cross port pressure relief valves 44 and 46 that serve to limit the maximum pressure in conduits 32 and 34 respectively.

As best seen in FIG. 2, each drive wheel 12 is driven by traction motor 26 via drive line 48. Mounted on each drive line 48 is a brake 50 of any suitable type, each of which serves to hold wheel 12 from rotation relative to drive line 48. Brakes 50 form a part of a brake system which includes a master cylinder 52, actuated by pedal 53, and a brake control valve 54. Master cylinder 52 is connected to brake control valve 54 by means of fluid conduits 56, 57, with brake control valve 54 is turn being connected to brakes 50 by means of conduits 58 and 60. Thus, actuation of master cylinder 52 generates pressurized fluid which is directed to brakes 50, causing them to be applied.

Motor casing 36 is connected, via fluid conduit 64 to a heat exchanger 66 which in turn is connected, via fluid conduit 68 and filter 70 to reservoir 72. A pressure relief valve 74 is also connected to conduits 64 and 68 in order to permit fluid flow in case heat exchanger 66 becomes clogged.

The inlet of charge pump 22 is connected to reservoir 72 via fluid conduit 76 and filter 78. Fixed displacement charge pump 22 supplies fluid through conduits or lines 80, 82, 84 and 86 to the primary closed loop circuit 32, 34 to insure that the loop always has sufficient hydraulic fluid. The fluid is delivered by the charge pump to the low pressure side of the closed primary loop through check valves 88, 90 in lines 84 and 86, respectively. Fluid conduit 80 also includes a fluid flow restriction or orifice 92, with conduit 80 further being connected to reservoir 72 via charge pressure relief valve 94.

One end of propulsion pump swash plate 42 is connected via a mechanical linkage 96, of any desired construction, to one end of piston rod 98 of a spring-centered double-acting hydraulic motor or cylinder 100.

Double-acting fluid motor 100 includes a housing 102 which is adapted to be mounted on pump casing 38 and extend partially into it. Slidably disposed in clyinder 100 is a piston 104 to which piston rod 98 is connected and which extends through both ends of cylinder 100. Piston 104, together with housing 102, defines a pair of chambers 106 and 108 having ports 110 and 112, respectively. Each of chambers 106, 108 contains one or more substantially similar springs 114, with the inner ends of spring 114 abutting the annular side surfaces of piston 104 thereby causing piston 104 to return to substantially centered or zero position at no load. It should be understood that the movement of piston 104 in one direction or the other causes a corresponding movement of swash plate 42 to thereby change the displacement of propulsion pump 24. As will be explained in detail later, the introduction of pressure fluid into one of chambers 106 and 108 causes the displacement of piston 104 and at least a partial compression of spring 114 in the other of chambers 106 and 108. The equalization of pressures in chambers 106 and 108, of course, permits springs 114 to again return piston 104 to its centered or zero position.

Also connected to charge pump 22, specifically to conduit 80 and downstream from orifice 92, is one end of a fluid conduit 118, the other end of which is connected to port 110 in cylinder 100. In addition, a further conduit 120 has one end connected to conduit 80, upstream from orifice 92, and the other end connected to port 112 of cylinder 100.

It should be understood at this time that fluid pressure upstream from orifice 92 is transmitted to the left hand end or chamber 108 of cylinder 100 through lines 80 and 120 while pressure downstream from orifice 92 is transmitted to the opposite end or chamber 106 in cylinder 100 via lines 80 and 118. Because of the foregoing, the differential pressure acting against piston 104 will be the same as and vary with the differential pressure across orifice 92. Thus, at any give time, a differential pressure is produced by engine driven charge pump 22, with the magnitude of this pressure varying directly with the magnitude of the engine speed. The resulting pressure produces a reaction in cylinder 100 which in turn causes a propulsion action on vehicle drive wheels 12. The total affect is that the propulsion of the vehicle varies with engine speed and the action produced in this system is swash plate motion in proportion to engine rpm. A resulting advantage of this system is that engine 18 can never stall since the pressure would be relieved in cylinder 100 as the engine speed is decreased.

The transmission control system also includes a directional control valve 124, which may, for example, be a conventional three-position manually operated four-way valve, which has a neutral position 124a as shown, a forward position 124b, and a reverse position 124c in which latter position the direction of flow of pressurized fluid to cylinder 100 is reversed. Thus, the direction of travel of piston 104 in cylinder 100 is controlled by valve 124. The position of this valve determines which of cylinder ports 110 or 112 receives the higher pressure. In the neutral position, 124a, cylinder ports 110 and 112 are interconnected, thereby, producing equal pressures and no cylinder reaction, i.e., piston 104 is biased to its neutral or center position via springs 114.

The transmission control system also includes a differential pressure regulator or inching control which can influence the displacement of propulsion pump swash plate 42. This control includes a differential pressure regulator valve 128 upstream from directional control valve 124, with valve 128 overriding the control pressures in conduits 118 and 120 via a control input which originates in brake master cylinder 52 and is channeled to port 130 in regulator valve 128 via conduit 56. A more complete functional and structural description or regulator or inching valve 128 will be made with reference to FIG. 3 hereinafter.

Interposed between directional valve 124 and regulator valve 128 is variable orifice fluid flow restrictor 134, with orifice 134 in turn being interposed in a conduit 136, one end of which is connected to conduit 118 while the other end is connected with conduit 120. Adjustable orifice 134 is used for adjusting or trimming the relative pressure difference between conduits 118 and 120, with this adjustment permitting the fine tuning of the operation of cylinder 100.

As also shown in FIG. 2, directional control valve 124, regulator valve 128 and adjustable orifice 134 are preferably located in a control cover 138 (not shown per se) bounded by phantom line 140, with control cover 138 also being connected to reservoir 72 by line 142.

Reference is now made of FIGS. 3, 4, 5 and 6 for a more detailed showing of the invention. Regulator valve 128 includes an elongated body 146 having a longitudinally extending bore 148 therein. Communicating with bore 148 is a high pressure inlet port 150 which is connected with conduit 120 so that high pressure fluid from pump 22 is communicated to bore 148. Also communicating with bore 148 is a low pressure inlet port 152 which in connected with low pressure conduit 118 so that lower pressure fluid from pump 22 is communicated to bore 148. Low pressure inlet port 152 includes an annular groove 154, the importance of which will become clear as the description of this valve progresses. Also communicating with bore 148 is a high pressure outlet port 156 that is connected with a further portion of conduit 120. In addition, also communicating with bore 148 is a low pressure outlet port 148 that is connected with a downstream portion of conduit 118.

Slidably disposed in bore 148 of valve body 146 is a spool 160 which controls the fluid flow between inlet port 150 and outlet port 156, and inlet port 152 and outlet port 158, as well as inlet port 152 and outlet ports 158 and 156. Spool 160 is actually an assembly of parts including an outer spool member 162, an inner spool member 164, a regulating spring 166, spring retainer sleeve 168 and combined annular stop and seal member 170, with the entire assembly being held together by a retainer ring 172 affixed to a portion of inner spool 164.

Outer spool member 162 has a longitudinally extending bore 176, with an inwardly projecting portion 178 near one end. Bore 176 contains regulating spring 166 and portion 178 provides a shoulder against which regulating spring 166 abuts. Outer spool member 162 also includes an annular groove 180 in the outer periphery thereof, with annular groove 180 defining annular land 182 on one end thereof and annular land 184 near the other end thereof. Annular lands 182 and 184 serve to control the communication of inlet ports 150 and 152 with outlet port 156. Annular groove 180 is connected to bore 176 by means of a connecting passage 186 so that fluid pressure in bore 176 is communicated to annular end surface 194 on outer spool member 162 adjacent land 182. Annular land 184 also has an annular step portion 185 and a reduced diameter portion 187, with the latter merging into an outer annular end surface 189.

Inner spool member 164 is mushroom-shaped and includes a flange portion 188 and a rod portion 190, with the latter having an annular stepped portion 192. Inner spool member rod portion 190 extends through portion 178 of outer spool member 162 and provides clearance therebetween so as to permit pressure fluid to flow from bore 176 to annular end surface 194 of outer spool member 162 adjacent to annular land 182.

Regulating spring 166 is disposed around rod portion 190 in bore 176 and is held in abutment with portion 178 by spring retainer sleeve 168 which likewise is disposed on rod portion 190 and abuts annular rod portion 192 on one end and the inner end of seal 170 on the other end, thus completing the assembly of spool 160.

Valve body 146 is also provided with a conduit 157, one end of which merges into low pressure outlet port 158 and the other end of which merges into bore 148 at a location so that low pressure fluid, from bore 154, is always acting at least against annular step portion 185 (FIG. 4) and also capable of acting on annular outer end surface 189 (FIGS. 3, 5 and 6) depending on the position of the outer spool member 162.

At this point it will be noted that outer spool member 162 is biased into abutment with flange portion 188 of inner spool 164 by regulating spring 166, unless sufficient fluid pressure from outlet port 156 is communicated to annular end surface 194 so as to overcome the bias of regulating spring 166 and that of the low pressure fluid acting on step portion 185 and end surface 189.

Threadably connected to valve body 146 is a cylinder member 196 which is disposed coaxially with bore 148 and a portion of which extends a short distance thereinto. Slidably disposed in cylinder 196 is piston 198. Integral with piston 198 is piston rod 200 which extends through one end of cylinder 100 into bore 148 to engage flange portion 188 of inner spool member 164. The outer end of cylinder 196 is provided with port 130 for connection with conduit 56 (FIG. 2) of the brake system for directing fluid into the cylinder.

One or more return springs 202 are disposed in bore 148 between combined seal and stop member 170 and the adjacent end of the bore, with return springs 202 tending to bias inner spool member 164 into abutment with the portion of cylinder 196 which is threaded into cylinder body 146 and thus serves as a stop and limits the movement in one direction, of inner spool member 164.

It should be noted that combined seal and stop member 170 is sealingly received within bore 148 and that the face of member 170 adjacent to springs 202 is exposed only to atmospheric pressure whereas the inner annular end face of member 170 is exposed to the pressure supplied by low pressure conduit 118. In the event of the leakage of pressurized fluid past member 170, valve housing 146 is also provided with a vent port 204.

Figure 3:
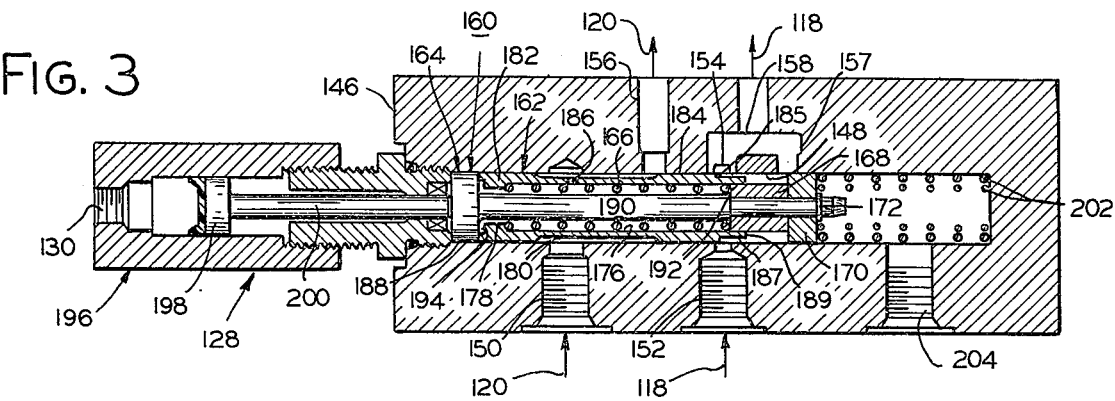
FIG. 3 is an enlarged fragmentary structural view of the differential pressure regulator valve shown diagrammatically in FIG. 2, with the positions of the regulator valve components reflecting engine idling and the valve being inactive.
Figure 5:
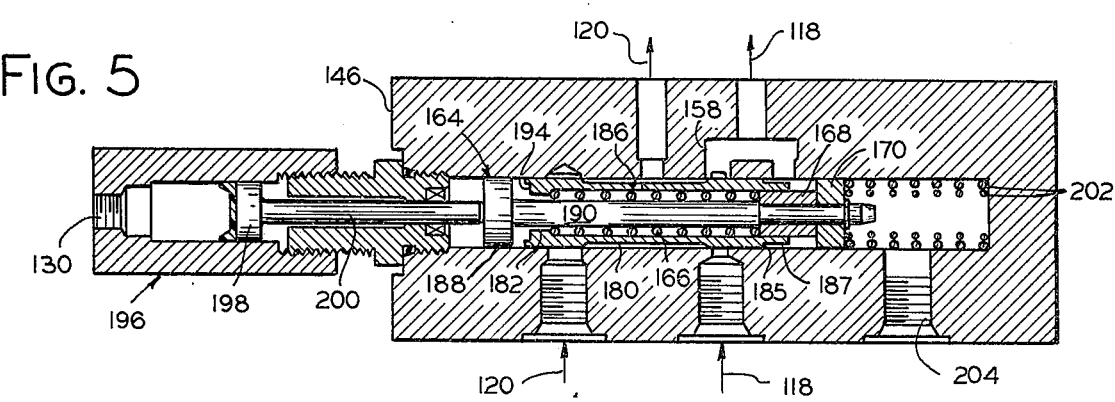
FIG. 5 is similar to FIG. 4, with the positions of the regulator valve components however reflecting partial depression of the brake pedal and the valve being in its regulating position.
Figure 6:
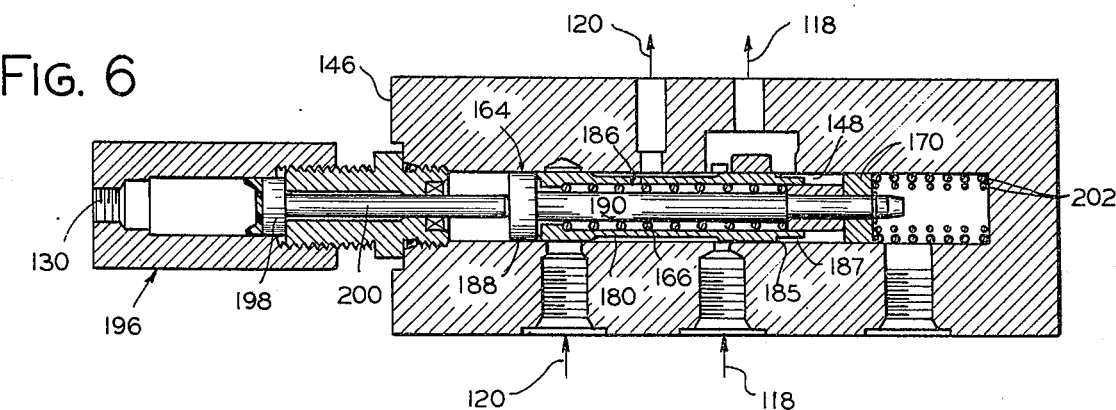
FIG. 6 is similar to FIG. 5, with the positions of the regulator valve components now reflecting full depression of the brake pedal and the valve being effectively overridden.

At this point, a comparison of FIGS. 3 and 6 will make clear that inner spool member 164 is actuatable between a first extreme position (FIGS. 3 or 4) when flange portion 188 is held in abutment with cylinder 196 by return springs 202, and a second extreme position (FIG. 6) determined by the point at which piston 108 bottoms on an inner portion of cylinder 196. In addition, it should also be noted that at the FIG. 3 and 6 positions, annular end surface 194 of spool outer member 162 substantially abuts flange portion 188 of inner spool member 164, with the compression loading of regulating spring 166 thus being substantially the same in these two extreme positions. However, an analysis of FIGS. 4 and 5, which portray positions intermediate those of FIGS. 3 and 6, will show that outer spool member 162 is axially displaced away from inner spool member flange portion 188, thereby increasing the compression loading of regulating spring 166.

In operation, when a lift truck, for example, is standing with its engine idling, the regulating valve is in an inactive position (FIG. 3) whereby the fluid communication between inlet ports 150, 152 and outlet ports 156, 158 respectively, is unrestricted. In this condition of regulating valve 128, there is a minimum of high pressure fluid pressure acting on annular surface end 194 while low pressure fluid is acting on annular end surface 189. Since there is no fluid pressure acting on piston 198, return springs 202 hold inner spool member 164 in abutment with cylinder 196. In the FIG. 3 position, high pressure fluid enters bore 148 via port 150 and outer spool member annular groove 180 and leaves therefrom via outlet port 156. At the same time, a portion of this high pressure fluid also enters outer spool member bore 176 via connecting passage 186 but is unable to overcome the forces of regulating spring 166 and the low pressure fluid acting on annular end surface 189 at this time, so that outer spool member annular end face 194 substantially abuts inner spool member flange portion 188. As previously noted, at the same time, low pressure fluid enters a portion of bore 148 via inlet port 152, annular groove 154, and bore 157. This low pressure fluid, however, is kept sealingly separate from the previously-noted high pressure fluid via annular land portion 184 and spring retainer sleeve 168 with a portion of the latter being in sealable slidable relationship with bore 176. In addition, seal and stop member 170 keeps the low pressure fluid from entering that portion of bore 148 occupied by return springs 202. The low pressure fluid exits from valve body 146 via exit port 158.

Figure 4:
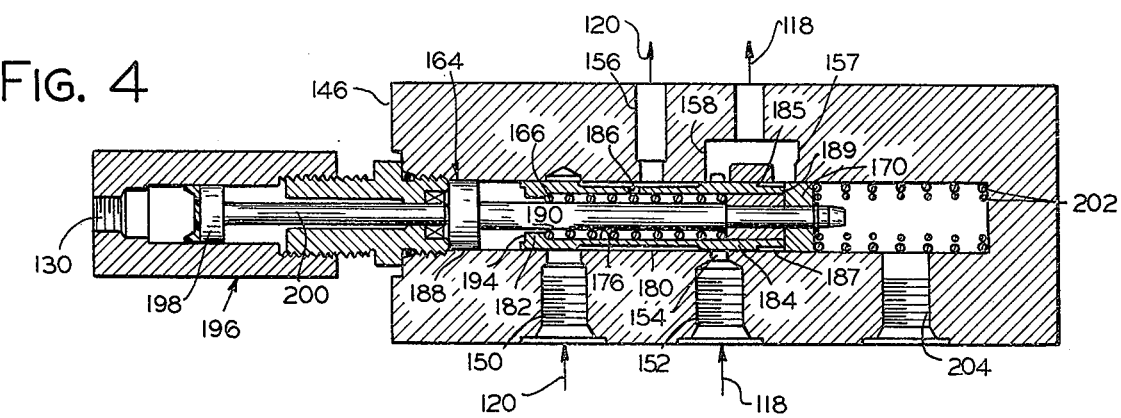
FIG. 4 is similar to FIG. 3, with the positions of the regulator valve components however reflecting increased engine speed and the valve starting toward its regulating position.

Now, assuming that the lift truck is traveling forwardly in a normal manner (FIG. 4), with increased engine speed, this increase in engine speed also proportionately increases the high pressure fluid pressure so that the high pressure fluid in bore 176 acts on outer spool member annular end surface 194, thereby compressing regulating spring 166 and displacing outer spool member 162 and the low pressure fluid acting on annular end surface 189 until member 162 abuts and rests against combined seal and stop member 170. Since there is still no fluid pressure acting on piston 198, return springs 202 are still holding inner spool member 164 in abutment with cylinder 196. At this time, low pressure fluid continues to enter annular groove 154 from inlet port 152 and exits from groove 154 into low pressure outlet port 158. Thus, at this point in operation, as shown in FIG. 4, the fluid communication between inlet ports 150, 152 and outlet ports 156, 158, respectively, is still unrestricted. As previously noted, high pressure outlet port 156 is connected to one of ports 110, 112 in cylinder 100 whereas low pressure outlet port 158 is connected to the other of ports 112, 110, depending of course on the position of directional control valve 124.

Now, assuming that the operator desires to "inch" the vehicle (FIG. 5), he depresses brake pedal 53 with his foot and thereby initiates application of the vehicle brakes and at the same time exerts fluid pressure on piston 198 and causes it to be axially displaced. The axial inward displacement of piston 198 results in the axial movement of inner spool member 164 against the bias of return springs 202 and again permits low pressure fluid to act against annular end surface 189. Outer spool member 162 will move along with inner spool member 164 until annular land 182 covers high pressure fluid inlet port 150 with the result that there is a drop in pressure in the fluid in bore 176 which is connected to the high pressure side (depending on the position of directional control valve 124) of hydraulic cylinder 100. At this time, low pressure inlet port 152 continues to be connected to low pressure outlet port 158 via annular groove 154 and to annular end surface 189 via groove 154 and conduit 157, with low pressure outlet port 158 being connected with the low pressure side of cylinder 100. The blocking of high pressure inlet port 150 by annular land portion 182 of course reduces the fluid pressure in the high pressure side of cylinder 100, and outer spool 162 continues to block communication of inlet port 150 with bore 176 until the fluid pressure contained therein drops to a point where the force exerted on outer spool member annular end surface 194 by the pressure fluid is in balance with the opposing forces exerted by regulating spring 166 and the low pressure fluid acting on annular end surface 189. At this point, outer spool member 162 will be in the regulating position shown in FIG. 5. So long as outer spool member 162 is serving to regulate the fluid pressure being delivered to the high pressure side of cylinder 100, it maintains substantially the position shown in FIG. 5, moving slightly to one side to open communication with inlet port 150 to compensate for any pressure drops caused by fluid leaking from high pressure side of cylinder 100, for example, and moving slightly in the other direction to close communication with inlet port 150 to compensate for a pressure rise.

As pointed out previously, the position of inner spool member 164 determines the forces exerted by regulating spring 166 and the low pressure fluid (via surface 189) on outer spool member 162, which in turn determines the pressure maintained in the high pressure side of cylinder 100 by regulating valve 128. Continued axial movement of inner spool member 164, caused by increased pressure on brake pedal 53, causes a continued decrease of the pressure maintained in the high pressure portion of cylinder 100. When, through continued axial movement of inner spool member 164, the flange portion 188 thereof just abuts inner end surface 194 of outer spool member 162, outer spool member 162 will be maintaining the minimum regulated pressure. When flange portion 188 of inner spool member 164 is in abutment with adjacent annular end surface 194 of outer spool member 162, it is of course no longer possible to regulate the fluid pressure to the high pressure portion of cylinder 100. Further, an additional inward movement of piston rod 206 further displaces inner and outer spool members 162, 164, respectively, so as to move the inner end of annular land 184 into annular groove 154 and thereby permits communication between groove 154 and bore 176 of outer spool member 162. This operational position is shown in FIG. 6 which also shows that, at this time, low pressure inlet port 152 is now connected to both outlet ports 158 and 156 so that low pressure fluid is conducted to both sides of cylinder 100 thereby causing piston 104 to become centered therein and thus moving swash plate 42 back to its zero position which in turn stops the vehicle.

Assuming now that the operator has depressed brake pedal 53 so that outer spool member 162 is maintaining a regulated pressure to the high pressure portion of cylinder 100, intermediate the minimum and maximum regulated pressures, the disposition of the movable parts of regulating valve 128 will be substantially as shown in FIG. 5. By allowing the brake pedal 53 to return to its normal position, the force exerted by brake pressure fluid on piston 198 is decreased so that inner spool member 164 is caused to move axially outwardly by return springs 202 with the result that the compression of regulating spring 166 is increased and the low pressure fluid acting on annular end surface 189 is displaced. Thus, the regulated pressure being maintained by outer spool member 162 also increases. When combined seal and stop member 170 finally comes into abutment with the annular end surface 189 of outer spool member 162, outer member 162 will be maintaining the maximum regulated pressure for inching operation. Further axial inward movement of inner spool member 164 carries outer spool member 162 along with it.

From the preceding description it should be clear that regulator valve 128 regulates a pressure differential in balanced and equal area portions or chambers 106, 108 of cylinder 100. Thus, regulator valve 128 controls high pressure against low pressure independent of vent pressure (atmospheric) and independent of the absolute magnitude of the low pressure in conduit 118. In addition, the low pressure fluid in conduit 118 is connected to the low pressure side of cylinder 100 at all times and never changes in value as a result of an input to the vehicle brake system, whereas the high pressure fluid is regulated depending on the input to the vehicle brake system. It should of course be understood that the low pressure in conduit 118 can change depending upon conditions in the external portions of the circuits, such as in filter 70, cooler 66 and cases 36, 38, etc. The throttling or shutting off of the high pressure fluid to the high pressure side causes a return of piston 104, in cylinder 100, toward its center position thereby in turn causing swash plate 42 to start to return to its center or neutral position. In the FIG. 6 position of valve 128, both sides of cylinder 100 are connected via lines 118 and 120 and ports 158, 156, respectively to low pressure inlet port 152 via groove 154 and groove 180, respectively, thus assuring the centering of piston 104.

The prior art regulating valves, such as the one shown in U.S. Pat. 3,143,127, only function to control clutch pressure and therefore need and utilize only high pressure and atmospheric pressure. In contrast thereto the regulating valve of this invention regulates the difference between high pressure and low pressure independent of atmospheric pressure and low pressure so as to regulate a pressure differential in a balanced double-acting cylinder that in turn controls the swash plate displacement.

The preceding description of a preferred embodiment of this invention is intended to be illustrative only and the scope of this invention should be determined from the following appended claims taken in conjunction with the prior art.

What is claimed is:
1. A differential pressure regulator valve comprising:
   a. an elongated body having a longitudinally extending bore therein, first pressure inlet and outlet ports in said body which communicate with said bore, second pressure inlet and outlet ports in said body which also communicate with said bore and are longitudinally spaced from said first inlet and outlet ports, an annular first groove in said body and in communication with both said second pressure inlet and outlet ports;
   b. a spool assembly slidably disposed in said bore, said assembly including an inner spool member actuatable between a first position and a second position, said inner spool member having a flange portion and a rod portion, an outer spool member having a longitudinally extending bore and an inwardly projecting portion therein through which said rod portion freely extends, an annular second groove in the outer periphery thereof and a passage connecting said second groove and said second-mentioned bore, said outer spool member being operable to alternately connect, via said second annular groove, said first inlet port with said first outlet port and said second inlet port with said first outlet port, said outer spool member also having an annular end portion and an associated reduced diameter step portion in the outer periphery thereof longitudinally spaced from said second groove, said body also having a conduit, one end of which merges into said second pressure outlet port and the other end of which merges into said first-mentioned bore so as to connect said second outlet port with at least said outer spool member reduced diameter step portion;
   c. a seal member fixed to the end of said rod portion opposite said flange portion and in sealing relationship with said first-mentioned bore;
   d. a spring retainer sleeve carried by said rod portion and disposed adjacent said seal member, said retainer being in sealable slidable relationship with second-mentioned bore;
   e. a regulating spring disposed in said second-mentioned bore and abutting said inwardly projecting portion therein at one end and said spring retainer sleeve at the other end;
   f. A return spring disposed in said first-mentioned bore for biasing said inner spool member toward said first position; and
   g. means for actuating said inner spool member toward said second position against the bias of said return spring.

2. The differential pressure regulator valve of claim 1 wherein said first inlet port is connected to a source of fluid under a first pressure and said second inlet port is connected to a source of fluid under a second pressure differing in value from said first pressure, with both of said first and second fluid pressures being greater than atmospheric pressure.

3. The differential pressure regulator valve of claim 2 wherein said first pressure value is greater than said second pressure value.

4. The differential pressure regulator valve of claim 2 wherein in a position intermediate said first and second positions of said inner spool member there is no flow between said first inlet and outlet ports and no flow between said second inlet and first outlet ports, with the first fluid pressure acting on one end of said outer spool member adjacent to said flange portion being balanced by the combination of the forces of said regulating spring and the second fluid pressure acting on at least said outer spool member reduced diameter step portion.

5. The differential pressure regulator valve of claim 1 wherein in one of said first and second positions of said inner spool member there is at least restricted flow between said first inlet and outlet ports.

6. The differential pressure regulator valve of claim 1 wherein in one of said first and second positions of said inner spool member there is at least restricted flow between said second inlet port and said first outlet port.

7. A differential pressure regulating valve comprising:
   a. an elongated body having a longitudinally extending bore therein, first pressure inlet and outlet ports in said body which communicate with said bore, second pressure inlet and outlet ports in said body which also communicate with said bore and are longitudinally spaced from said first inlet and outlet ports, an annular groove in said body and in communication with both said second pressure inlet and outlet ports;
   b. a spool slidably disposed in said bore, said spool including a first spool member actuatable between two extreme positions and having a rod portion, a second spool member operable to alternately control fluid flow between said first inlet and outlet ports and said second inlet port and said first outlet port, said second spool member having a bore therein through which said rod portion freely extends;
   c. first resilient means tending to bias said second spool member, to a position establishing unrestricted flow between said first inlet and outlet ports;
   d. means including a passage connecting said first outlet port with said second-mentioned bore for fluidly unbalancing said second spool member by applying the pressure of fluid in said first outlet port to one end of said second spool member in opposition to the biasing action of said first resilient means;

e. means including a passageway in said body connecting said second outlet port with the other end of said second spool member for fluidly unbalancing said second spool member by applying the pressure of fluid in said second outlet port to said second spool member other end in addition to the biasing action of said first resilient means; and f. second resilient means for biasing said first spool member toward one of said extreme positions.

8. The differential pressure regulating valve of claim 7 wherein said first inlet port is connected to a source of fluid under a first pressure and said second inlet port is connected to a source of fluid under a second pressure differing in value from said first pressure with both of said first and second fluid pressures being greater than atmospheric pressure.

9. The differential pressure regulating valve of claim 7 wherein in one of said extreme positions of said first spool member there is at least restricted flow between said first inlet and outlet ports.

10. The differential pressure regulating valve of claim 7 wherein in one of said extreme positions of said first spool member there is at least restricted flow between said second inlet and said first outlet ports.

11. The differential pressure regulating valve of claim 7 wherein in a position intermediate said two extreme positions of said spool there is no flow between said first inlet and outlet ports and no flow between said second inlet and first outlet ports, with the pressure acting on said one end of said second spool member being balanced by the combination of the force of said first resilient means and the pressure acting on said other end of said second spool member.

12. The differential pressure regulating valve of claim 7 further including sealing means fixed to one end of said rod portion, said sealing means being in slidable sealing relationship with said first-mentioned bore, with one end of said sealing means abutting said second resilient means.

13. The differential pressure regulating valve of claim 7 further including a retainer sleeve carried by said rod portion for retaining one end of said first resilient means, said retainer sleeve also being in sealable slidable relationship with said second-mentioned bore.

14. The differential pressure regulating valve of claim 7 wherein said other end of said second spool member includes a reduced diameter step portion in the outer periphery thereof.

* * * * *